United States Patent [19]

Thurston et al.

[11] Patent Number: 4,930,357
[45] Date of Patent: Jun. 5, 1990

[54] FLUIDIC VOLUMETRIC FLUID FLOW METER

[75] Inventors: John F. Thurston; Alan L. Golembiewski, both of Mesa, Ariz.

[73] Assignee: Allied-Signal Inc., Morris Township, N.J.

[21] Appl. No.: 933,648

[22] Filed: Nov. 21, 1986

[51] Int. Cl.⁵ .................................................. G01F 1/20
[52] U.S. Cl. ..................................... 73/861.19; 137/833
[58] Field of Search ................. 73/861.19, DIG. 8; 137/826, 835, 833

[56] References Cited

U.S. PATENT DOCUMENTS

| | | |
|---|---|---|
| 3,015,233 | 1/1962 | Ryder et al. . |
| 3,240,061 | 3/1966 | Bloom et al. . |
| 3,338,097 | 8/1967 | Bloom et al. . |
| 3,371,530 | 3/1968 | Howe . |
| 3,430,489 | 3/1969 | Pfrehm . |
| 3,610,162 | 9/1986 | Okabayashi et al. ............ 73/861.19 |
| 3,635,084 | 1/1972 | Lamphere et al. . |
| 3,690,171 | 9/1972 | Tippetts et al. . |
| 3,699,812 | 10/1972 | Masnik . |
| 3,889,534 | 6/1975 | Grant . |
| 4,050,304 | 9/1977 | Thomas . |
| 4,107,990 | 8/1978 | Ringwall . |
| 4,154,115 | 5/1979 | Harting et al. ....................... 73/718 |
| 4,244,212 | 1/1981 | Stignani et al. ................ 73/861.32 |
| 4,404,859 | 9/1983 | Ohsawa et al. . |
| 4,584,883 | 4/1986 | Miyoshi ........................... 73/861.24 |
| 4,716,936 | 1/1988 | Mon et al. ............................ 137/833 |

FOREIGN PATENT DOCUMENTS 1400831  7/1975  United Kingdom .

Primary Examiner—Charles A. Ruehl
Attorney, Agent, or Firm—Robert A. Walsh; James W. McFarland; Terry L. Miller

[57] ABSTRACT

Fluidic volumetric flow meter method and apparatus wherein undesirable dynamic interaction (ringing) which could appear in an output signal is inhibited. Electrical isolation and shielding also contribute to a high quality output signal in accordance with the invention. Particularly advantageous housing structures adapt the flow measurement device to a variety of applications as a complete flow meter.

48 Claims, 6 Drawing Sheets

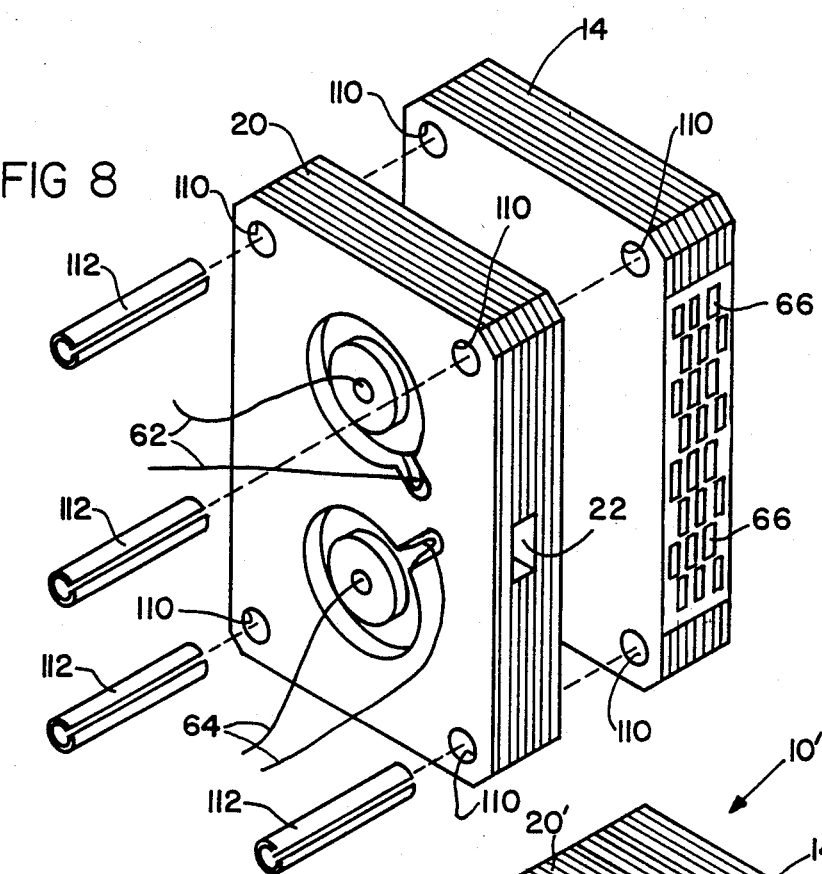
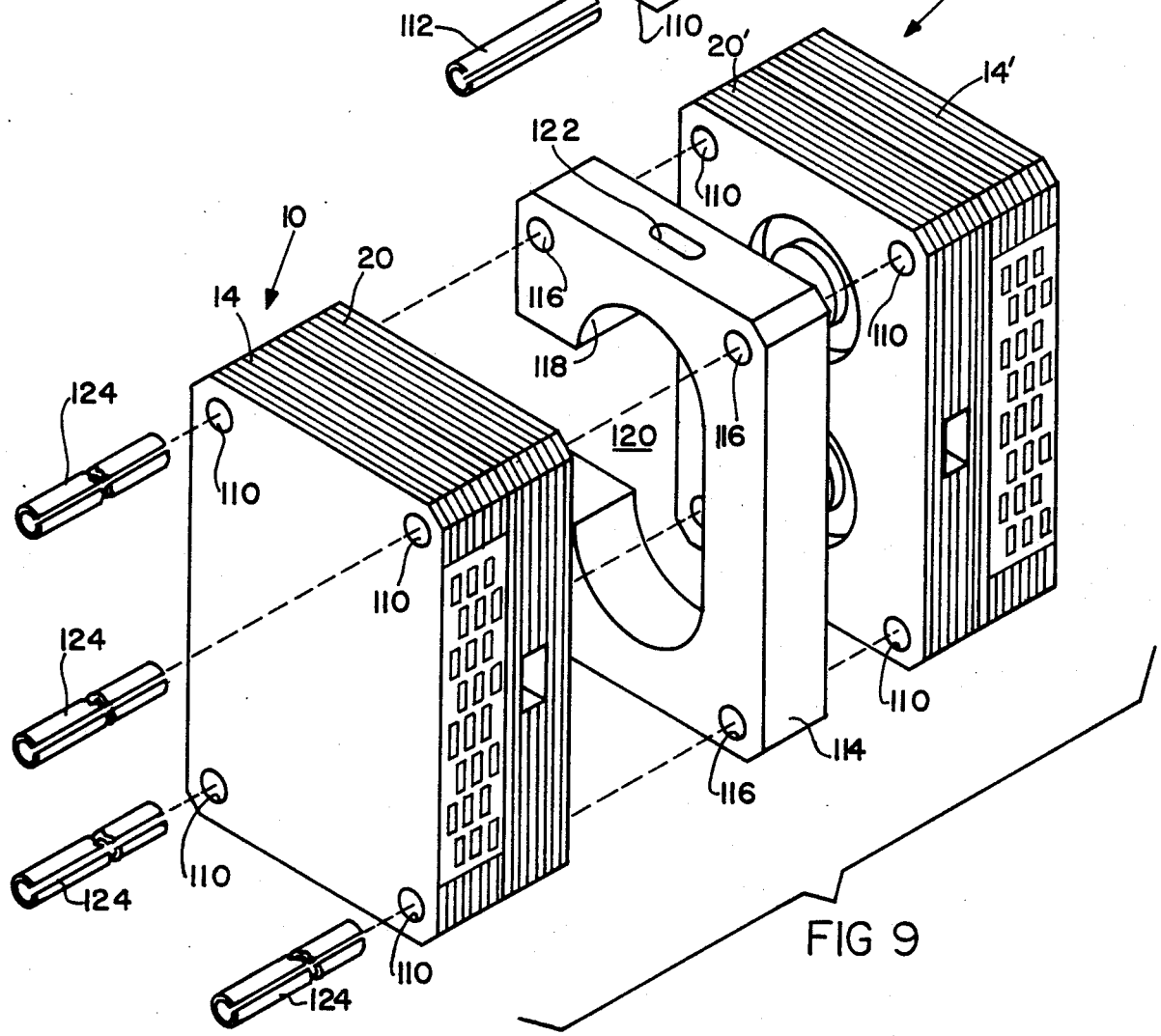

FLUIDIC VOLUMETRIC FLUID FLOW METER

BACKGROUND OF THE INVENTION

The field of the invention is apparatus and methods for measurement of volumetric flow rate of flowing fluid. More particularly, the invention relates to dynamic or inferential measurement devices, as opposed to positive displacement measuring devices, which former devices are additionally of fluidic operation.

Conventional fluidic measuring devices in the field to which the present invention relates are disclosed in the following U.S. Pat. Nos.

| U.S. Pat. No. | ISSUED | INVENTOR(S) |
| --- | --- | --- |
| 3,690,171 | 12 September 1972 | Tippetts, et al |
| 3,889,534 | 17 June 1975 | J. Grant |
| 4,050,304 | 27 September 1977 | A. Thomas |
| 4,107,990 | 22 August 1978 | C. Ringwall |
| 4,404,859 | 20 September 1983 | Ohsawa, et al |

These teachings establish that the possibility of measuring fluid flow rate, either on a volume or mass basis, has been recognized for a number of years. The first three teachings listed above are believed to apply wall-attachment type fluidic oscillators to, respectively, measurement of volumetric flow rate as a function of oscillator frequency, to measurement of mass flow rate as a function of oscillator amplitude and frequency, and to measurement of mass flow rate as a function of oscillator frequency and total pressure drop across the oscillator.

The Ringwall U.S. Pat. No. 4,107,990 recognizes the deficiencies of wall-attachment fluidic oscillators in the application to flow rate measurement. Accordingly, the Ringwall patent teaches use of a differential pressure proportional fluidic oscillator to provide a volumetric flow rate meter. However, to extend the measurement range of the Ringwall teaching beyond that obtainable with a single oscillator, multiple amplifier stages must be utilized. Additionally, it is believed that the signal quality which is obtained from an oscillator as taught by Ringwall may be less than optimum. This output signal is believed to be contaminated with dynamic oscillation, or ringing, noise which is internally self-generated by the oscillator as a result of internal fluid inductances and capacitances.

An alternative approach to fluid mass flow rate measurement is presented by U.S. Pat. No. 4,508,127 issued 2 April 1985 to a coinventor of the present invention and assigned in common therewith. The disclosure of the '127 patent is specifically incorporated herein by reference to the extent necessary for a complete disclosure and understanding of the present invention. The '127 patent teaches use of a dynamic volumetric flow rate meter, such as a turbine meter, to obtain a signal indicative of volumetric fluid flow rate. A fluidic oscillator having a regulated total pressure drop thereacross is employed to generate a second signal indicative of fluid density. The two signals are combined by multiplication to obtain an indication of fluid mass flow rate.

However, it is desirable to provide a volumetric fluid flow rate meter which avoids the use of moving-part type flow meters. The fluidic oscillator because of its rugged, no-moving-parts construction is recognized as offering considerably improved service life over all flow meters having moving parts, such as the turbine flow meter, for example. Further, the limited flow measurement range and need for multiple oscillators of the Ringwall teaching should be avoided. Finally, it is highly desirable to provide such a volumetric flow rate meter with a "clean" output signal substantially free of both self-generated noise or ringing, and noise of electrical origin.

SUMMARY OF THE INVENTION

The inventors have discovered that internally self-generated noise in a fluidic oscillator may result from dynamic interaction between moving fluid in the feedback channels of the oscillator and the output signal generating apparatus. In other words, the feedback channels provide a fluid inductance, and the output transducers a fluid capacitance which under the influence of the pulsating, time-variant oscillations of the oscillator itself set up an internal self-generated noise or ringing. This ringing noise appears in the output signal of the flow meter and degrades the performance or measurement accuracy thereof.

Accordingly, the invention provides a fluidic device having an inlet and a flow path extending from the inlet to the outlet. A part of the flow path defines a power jet nozzle upstream of and leading to an interaction chamber. The interaction chamber leads to the outlet. A splitter is spaced from the power nozzle across the interaction chamber and is in alignment therewith to separate a pair of feedback inlets leading from the interaction chamber. A pair of feedback channels extend from the pair of feedback inlets to respective feedback outlets. The feedback outlets are oppositely disposed perpendicularly to the power nozzle and intermediate the latter and the interaction chamber. A branch passage extends from each feedback channel to a respective variable-volume chamber which is bounded by a flexible diaphragm. The diaphragms are movable in response to pressure variations within the respective variable-volume chamber and are associated with means for producing an output signal in response to such movement. Fluid flow restriction means are provided in each branch passage for resisting dynamic oscillation (ringing) of fluid flow in the feedback channels with the variable volume of fluid in the variable-volume chambers.

In a further aspect of the invention, second fluid flow restriction means are provided in each of the feedback channels between the branch passage and the feedback outlet of each. These second fluid flow restriction means have the effect of increasing the magnitude of the pressure fluctuations in the variable-volume chambers and thereby of increasing the magnitude of the output signal produced, notwithstanding the first fluid flow restrictions.

According to still another aspect of the invention, a vent passage is provided opening outwardly of each variable-volume chamber to communicate with the outlet, and third fluid flow restriction means is provided in each vent passage.

Yet another aspect of the invention provides fluid flow bypass means in fluid flow parallel with the first-described fluidic device. The bypass means provides a plurality of fluid flow parallel flow paths. Each of the flow paths of the bypass means replicates the power nozzle of the first-described fluidic device so that the same characteristic of coefficient of discharge is provided by the parallel plural flow paths.

Additional aspects of the invention provide housing structure for receiving both the first-described fluidic device and a second-described bypass means, the two cooperatively defining a fluid volume flow rate module. The housing also provides for communication outwardly thereof of the output signal of the device. In one particularly described and depicted embodiment of the invention, redundant volume flow rate measurement modules are provided in a uniquely arranged structure which is particularly advantageous in the aerospace technologies.

Still additionally, the invention provides a fluid volumetric flow meter wherein an output transducer includes an electrically conductive diaphragm bonded electrically with a piezoceramic disc. Both the diaphragm and the disc are electrically isolated from surrounding structure. Upon flexure of the diaphragm an electrical signal is produced across the piezoceramic and is conducted to a point of utilization in part by the diaphragm, but not by surrounding structure. Surrounding structure may effectively shield the output transducer from electrical interference.

Additional objects and advantages of the present invention will appear from reading the following detailed description of several preferred embodiments of the invention taken in conjunction with the accompanying drawing figures. The following detailed description includes description of embodiments of the invention which may be employed as principal components of a liquid fuel volume flow rate sensor, a part of an electronic fuel controller for a turbine engine. However, the invention is not limited to such use and is not intended to be so limited. In fact, in many respects the invention has almost universal application to the art of flow measurement. This broad scope of the present invention will quickly appear to those skilled in the art of flow measurement in view of the following.

BRIEF DESCRIPTION OF THE DRAWING FIGURES

FIG. 1 schematically depicts a liquid volumetric flow rate meter embodying the invention;

FIG. 2, functionally and schematically depicts a fluidic flow rate sensing device embodying the invention;

FIG. 3 graphically presents data of output signal level versus fluid volumetric flow rate obtained by testing an actual reduction to practice of the present invention;

FIG. 4 depicts a sequentially arranged group of laminae which when stacked and interbonded in the alphabetic order presented cooperatively define a fluid flow rate sensing device according to one embodiment of the invention;

FIGS. 5 and 6, respectively, present a fragmentary plan view and a fragmentary partially cross-sectional view of a portion of the fluid flow rate sensing device of one embodiment of the invention;

FIG. 8 is an exploded perspective view of a fluid flow rate module embodying the invention and including a fluidic flow rate sensing device and a bypass member;

FIG. 9 is an exploded perspective view similar to FIG. 8 and depicting an alternative embodiment of the invention which provides a redundant output fluid flow rate sensing module;

Figure 10:
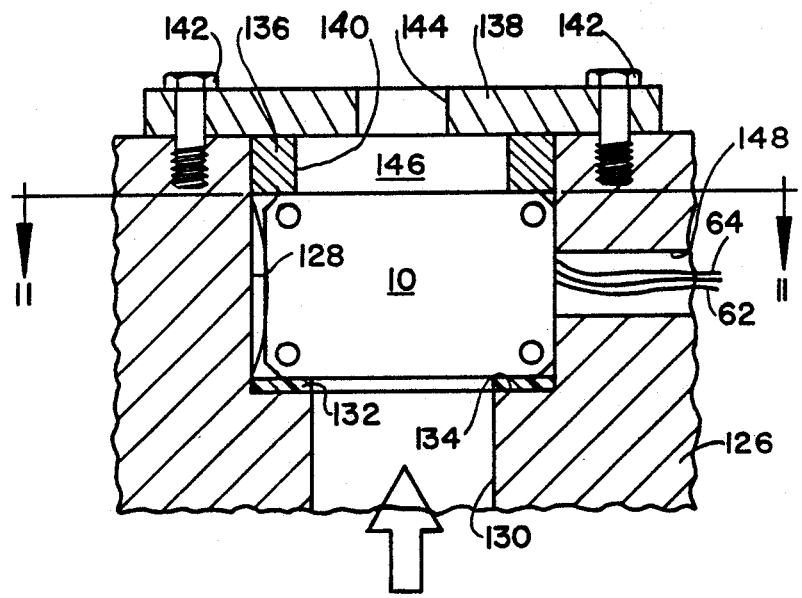
Figure 11:
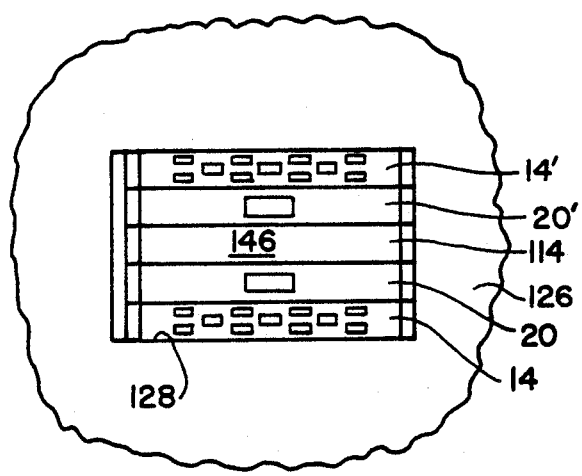
Figure 12:
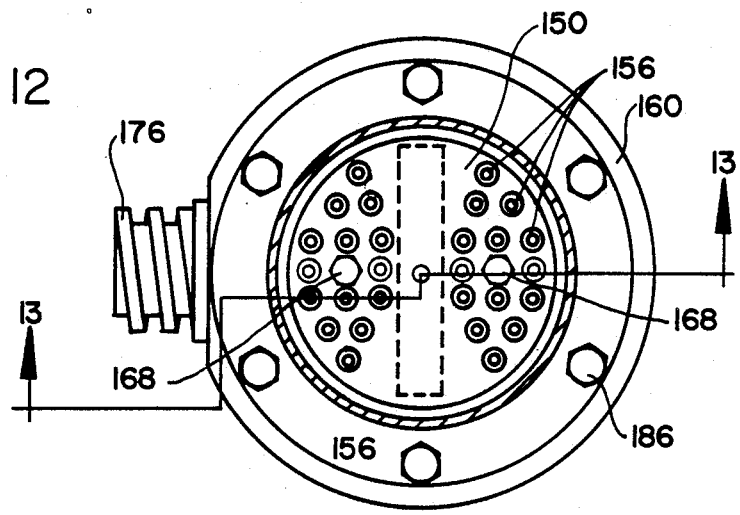
Figure 13:
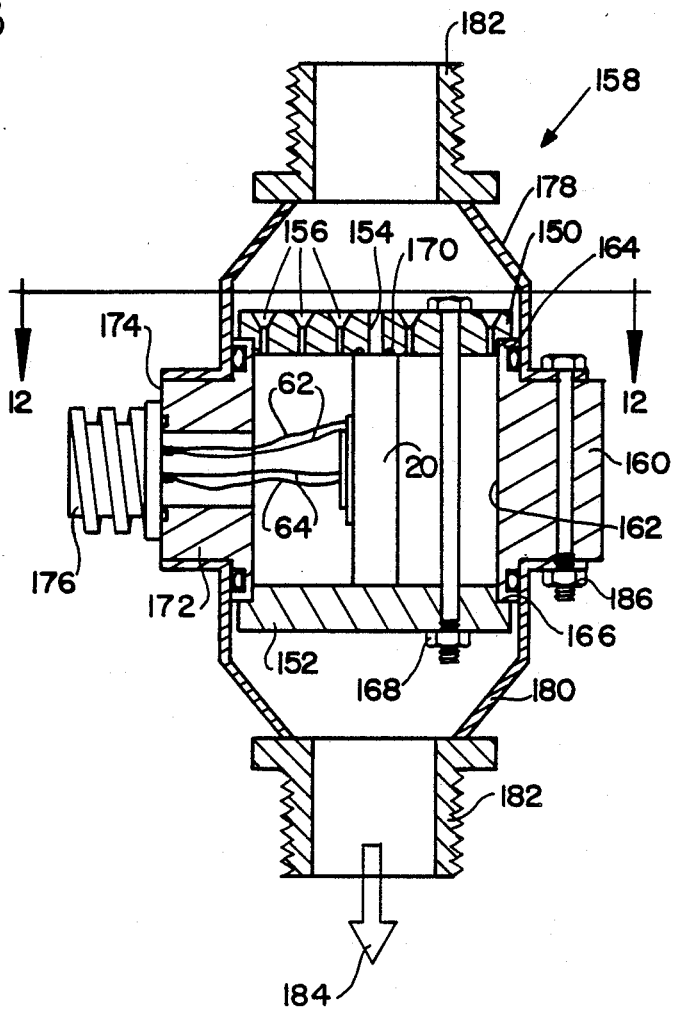

FIGS. 10 and 11, respectively, depict fragmentary cross-sectional views of a fluid flow meter employing a redundant module like that depicted in FIG. 9 and a housing providing for fluid flow to and from the flow rate sensing module;

FIG. 12 depicts a partially cross-sectional view of an alternative embodiment of a fluid flow meter embodying the invention; and FIG. 13 is a cross-sectional view taken along line 13—13 of FIG. 12.

DETAILED DESCRIPTION OF THE PREFERRED EMBODIMENTS OF THE INVENTION

Figure 1:
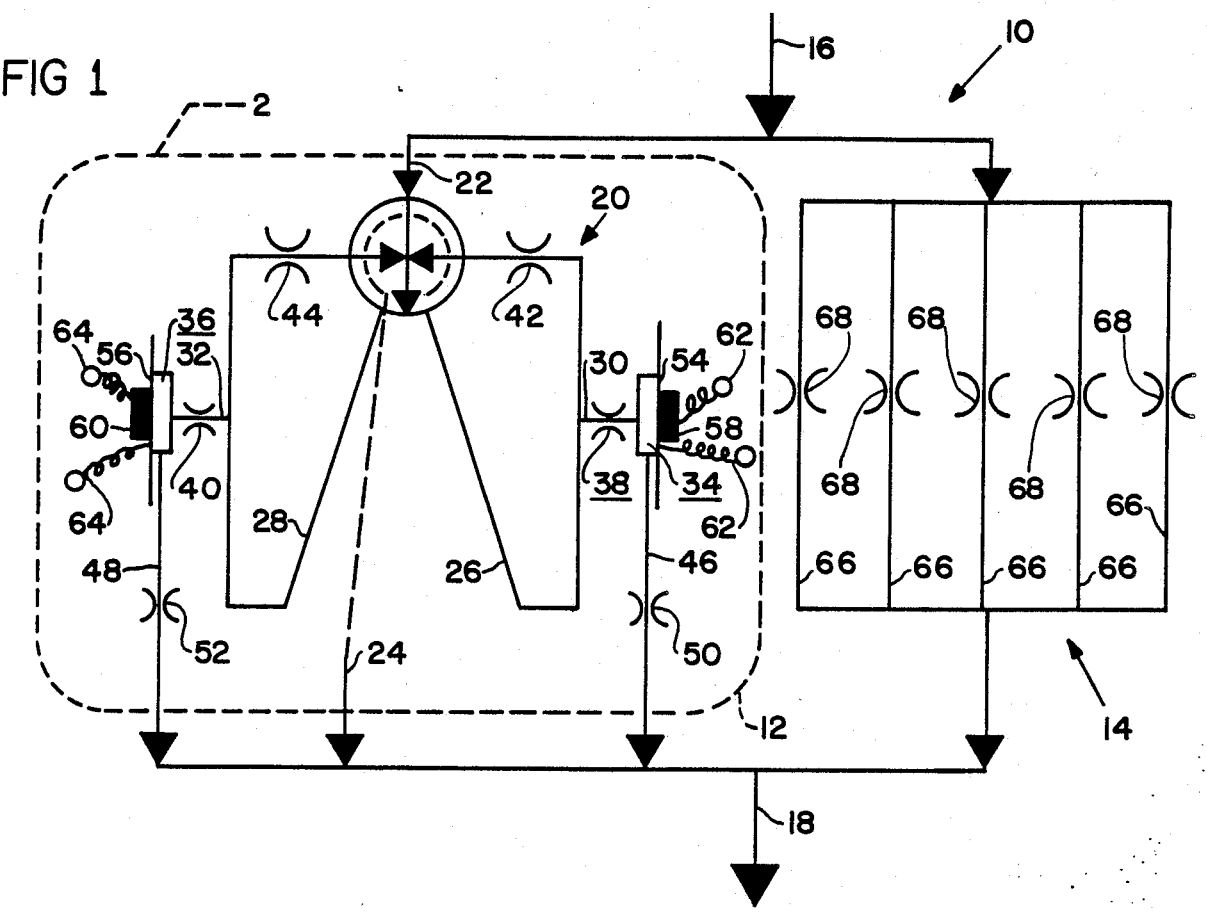

FIG. 1 depicts schematically a fluidic liquid volumetric flow meter, which is generally referenced with the numeral 10. Flow meter 10 includes a flow sensing device 12 and a bypass unit 14. An inlet 16 to the flow meter communicates both with the flow sensing device 12 and with the bypass unit 14, while an outlet 18 from the flow meter similarly communicates with both 12 and 14. The flow sensing device 12 includes a fluidic oscillator 20 having an inlet 22 and outlet 24 and feedback channels 26,28. Connected with the feedback channels 26,28 via branch passages 30 and 32 are a pair of variable-volume sensing chambers 34,36. Each of the branch passages 30,32 includes a fluid flow restriction 38,40, respectively. Similarly, each of the feedback passages 26,28 includes a fluid flow restriction 42,44. Extending from each of the variable volume sensing chambers 36,38 is one of a pair of vent passages 46,48, each having its respective fluid flow restriction 50 and 52. Each of the variable-volume chambers 34 and 36 is bounded by a flexible and electrically conductive diaphragm 54 and 56, respectively, upon which is mounted a sensing transducer 58 and 60. As will be further described hereinafter, the diaphragms are responsive to pressure variations within the chambers 34 and 36 to flex, which results in the transducers 58 and 60 providing electrical output signals via conductors 62 and 64.

While not depicted in FIG. 1, it will be seen that the fluidic oscillator 20 includes a power jet nozzle which directs a stream of fluid from the inlet toward the outlet. The power jet nozzle of the fluidic oscillator 20 results in a measurable pressure drop between the inlet 22 and the outlet 24 of the oscillator 20. Turning for a moment to the structure of the bypass unit 14, it will be seen that this unit provides a plurality of flow paths each referenced with the numeral 66. Each flow path 66 is in fluid flow parallel with the flow path through the fluidic oscillator 20 between inlet 22 and outlet 24 thereof. Each flow path 66 of the bypass unit 14 is provided with a fluid flow restriction 68 which replicates the coefficient of discharge characteristic of the power jet nozzle within the fluidic oscillator 20. As a result, because the pressure drop across the flow meter 10 between inlet 16 and outlet 18 is the same for the fluidic oscillator 20 as it is for the bypass unit 14, each of the flow paths 66 within the bypass module 14 will flow substantially the same fraction of volume of fluid per unit time as that which flows through the fluidic oscillator 20.

Figure 2:
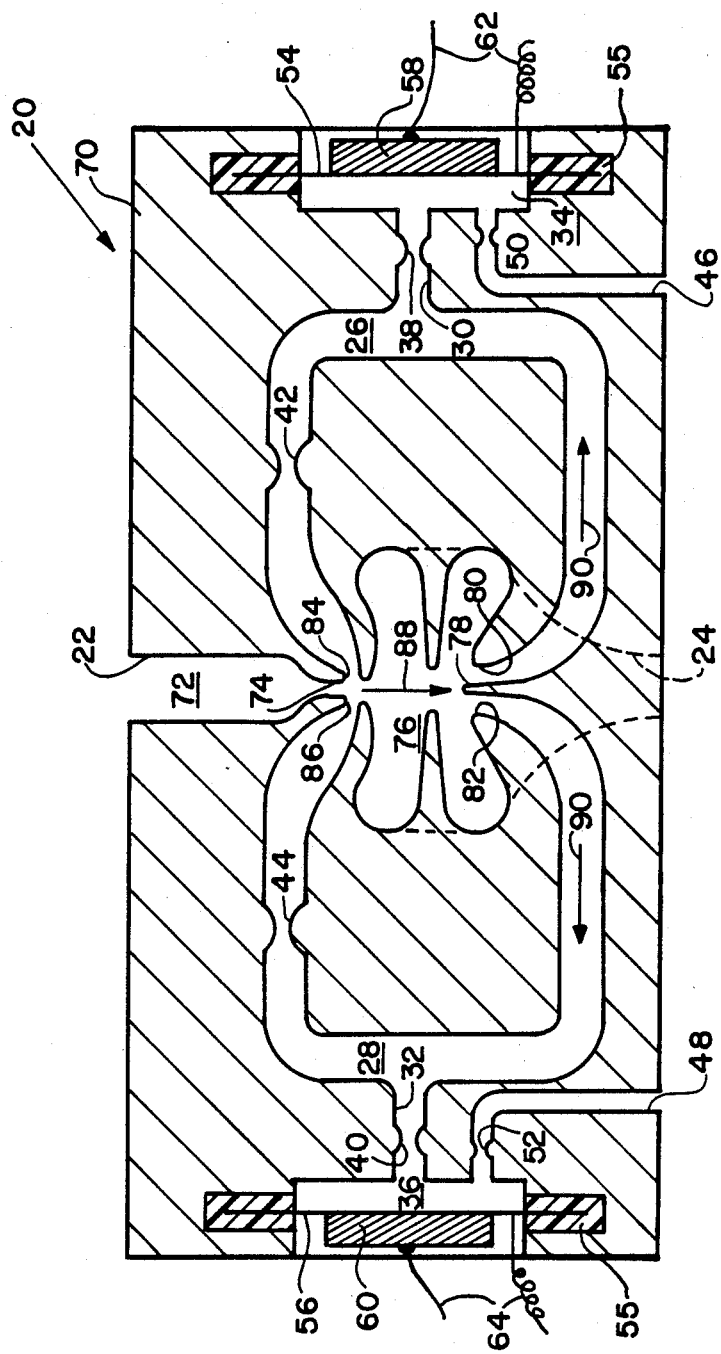

Turning to FIG. 2, it will be seen that the fluidic oscillator 20 includes a housing 70 defining the inlet 22, outlet 24 and other structures of the fluidic oscillator. The housing 70 defines a flow path generally referenced with the numeral 72 and extending between the inlet 22 and the outlet 24. The flow path 72 defines a power jet nozzle 74 opening into an interaction chamber generally referenced with the numeral 76. The interaction chamber 76 opens downwardly out of the plane of FIG. 2 to the outlet 24. Housing 70 also defines a knife-edged splitter member 78 which is aligned with the power jet nozzle 74 and is disposed oppositely thereof across interaction chamber 76. The splitter member 78 separates a pair of feedback inlets 80 and 82 which communicate respectively with the feedback channels 26 and 28. Each one of the feedback channels 26 and 28 communicates respectively with one of a pair of feedback outlets 84,86 which are oppositely disposed perpendicularly to the power jet nozzle 74, and between the latter and the interaction chamber 76.

In order to reduce the effect of electrical interference upon the output signal produced by the transducers 58,60, an electrical insulation 55 is provided between the diaphragms 54,56 and the housing 70. As a result, both the diaphragms 54,56 and transducers 58,60 are electrically isolated from the housing 70. As will be further seen hereinafter, the housing 70 may act to additionally shield the transducers 58,60 and diaphragms 54,56 from electrical interference.

Having observed the basic structure of the fluidic oscillator 20, it is well to now consider its method of operation. It will easily be understood that when fluid flows into the inlet 16 of the fluid flow meter a portion of this fluid must flow through the fluidic oscillator 20 via inlet 22, the flow path 76 leading to outlet 24 and vent passages 46,48. Fluid entering the inlet 22 upon flowing through the power jet nozzle 74 forms a stream of fluid referenced with the numeral 88 which projects across the interaction chamber 76 toward the splitter member 78. Upon encountering the splitter member 78, the fluid stream 88 divides so that a portion thereof is received by each of the feedback inlets 80 and 82. Inherently, a slightly greater portion of the fluid stream 88 will be received by one of the feedback inlets 80 and 82 than is received by the other of these feedback inlets. The velocity of the fluid stream 88 is partially reconverted to pressure at the feedback inlets 80 and 82 in proportion to the degree of split of the fluid stream 88. Fluid received by the feedback inlets 80 and 82 is communicated by the respective feedback channels 26 and 28 to the respective feedback outlets 84 and 86. Because one of the feedback inlets will have received a slightly greater portion of the fluid stream 88, fluid issuing from the associated feedback outlet will exert a greater lateral pressure force upon the fluid stream issuing from power jet nozzle 74 than does the fluid from the other feedback outlet. As a result of the differential pressure effective at outlet 84,86, the fluid stream 88 will be urged toward the feedback inlet having received the lesser portion of the stream 88. This phenomenon results in oscillation of the fluid stream 88 between the two feedback inlets 80 and 82 on opposite sides of the splitter member 78. The period of oscillation is a function of the velocity of the fluid stream 88 and the effective transport and feedback distances of the oscillator 20. This transport distance in substance is the linear dimension from the area where the power jet nozzle 74 opens to the interaction region 76 adjacent the feedback outlets 84 and 86, across the interaction chamber 76 to the feedback inlets 80,82. The feedback distance is the dimension around the feedback channels 26 and 28 to the feedback outlets 84 and 86.

It will be understood that not all of the fluid stream 88 is received into the feedback inlets 80 and 82 and that the majority of the fluid is allowed to flow from the fluidic oscillator 20 via the outlet 24. Considering the fluid within the feedback channels 26 and 28, it will be seen that when the fluid stream 88 is received into either one of the feedback inlets 80 or 82, the associated channel receives a portion of fluid the kinetic energy of which is partially converted to a pressure which migrates through the fluid within the feedback channel at the acoustic velocity of the particular fluid. The pressure in the feedback channels communicates via the branch passages 30 and 32 into the variable-volume sensing chambers 34 and 36. As a result, the diaphragms 54 and 56 flex in response to the pressure variations experienced within the sensing chambers 34 and 36. Flexing of the diaphragms 54 and 56 results both in variation of the volume defined within chambers 34,36, and in flexing of the transducers 58 and 60. Flexing transducers 58,60 result in an electrical signal conducted by conductors 62 and 64. It will be seen that as the diaphragms 54 and 56 flex, the volumes of the chambers 34 and 36 increase and decrease so that the chambers 34 and 36 exhibit fluidically a capacitance. The channels 26,28 may be considered to exhibit a fluidic inductance which arises from the liquid density and the dimensions of these channels.

In order to prevent the capacitance of the sensing chambers 34 and 36 from dynamically interacting with the inductance of the feedback channels 26 and 28 to produce noise or ringing, the Applicants provide fluid flow restrictions 38 and 40 in the branch passages 30 and 32. However, the restrictions 38 and 40 would have the effect, the Applicants believe, of reducing the magnitude of the pressure variations experienced in the chambers 34 and 36 and available for sensing by flexing of the diaphragms 54 and 56. In order to offset this reduction in the pressure variations experienced in the sensing chambers 34 and 36, the Applicants provide fluid flow restrictions 42 and 44 which are disposed downstream of the respective branch passages at each of the feedback channels 26 and 28. Further, in order to insure that all air or compressible gas is purged from the sensing chambers 34 and 36 and therefore does not interfere with flexing of the diaphragms 54 and 56 by fluid pressure variations experienced therein, the Applicants provide the vent passages 46 and 48 having fluid flow restrictions 50 and 52 therein. These vent passages allow a relatively small but significant flow of fluid from the feedback passages 26 and 28 through the respective sensing chambers 34 and 36 so that all compressible gases are purged therefrom.

Figure 3:
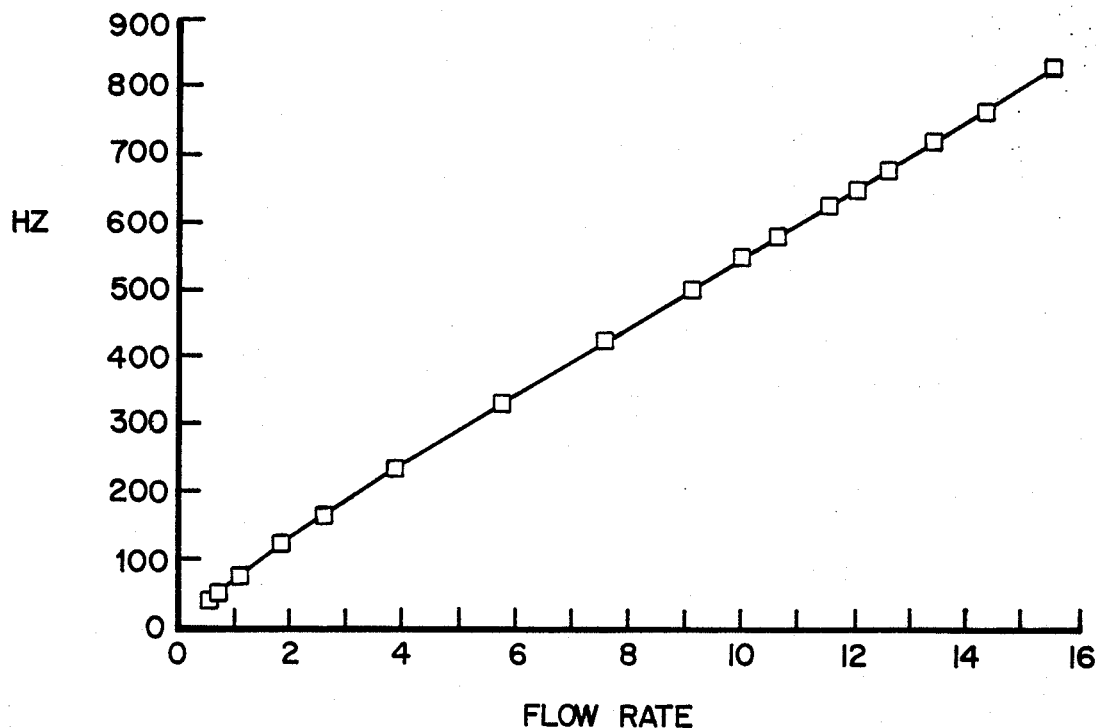
Figure 4:
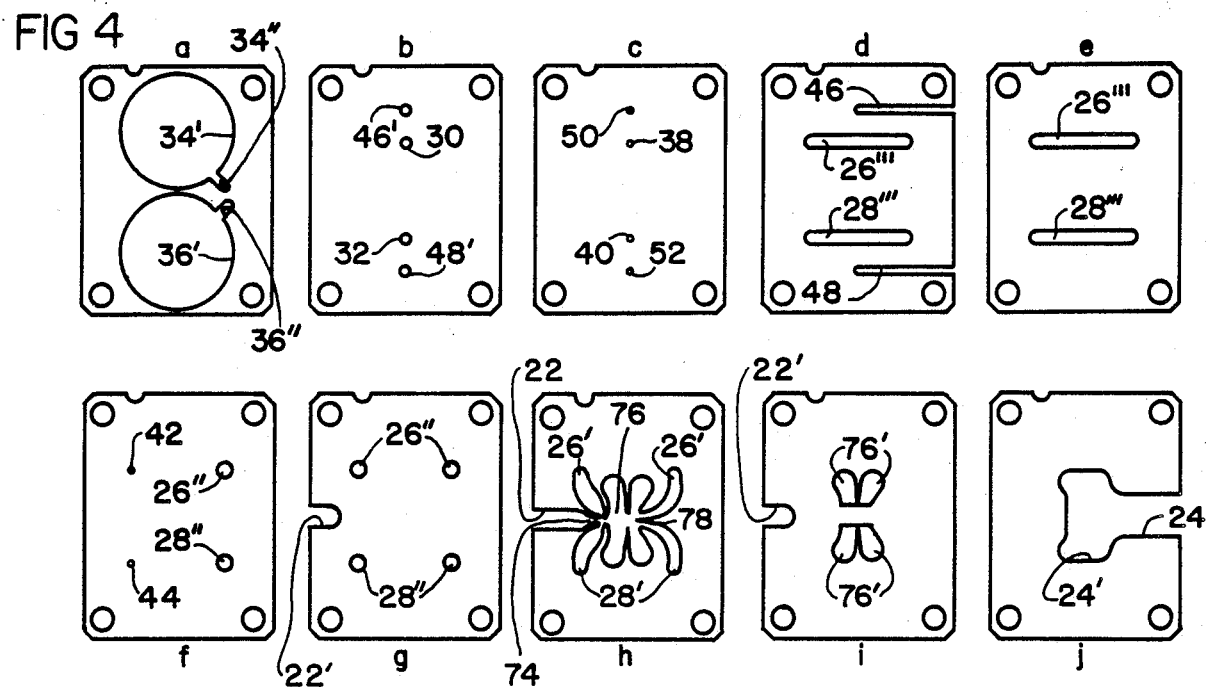

Turning to FIG. 3, it will be seen that an oscillator according to an actual reduction to practice of the present invention displayed a high degree of linearity of oscillation frequency verses liquid flow rate passing therethrough. FIG. 3 shows the plotting points resulting from testing of the oscillator at various known liquid flow rates fall, in effect, perfectly on a straight line. The actual reduction to practice of the inventive oscillator was effected by the use of stacked fluidic laminae as are depicted by FIG. 4. These laminae are alphabetically designated "a" through "j" on FIG. 4 in stacking order. In order to promote continuity of description, features of the laminae which are analogous in structure or function to those which were depicted schematically in FIGS. 1 and 2 are referenced with the same numeral, perhaps with one or more primes added to distinguish portions of structure.

Viewing FIG. 4 in greater detail it will be seen that lamina "h" defines an inlet 22 in conjunction with laminae "g" and "i" having notches 22' aligning with the inlet passage 22 in lamina "h" to define a convergent inlet opening. Lamina "h" likewise defines a pair of feedback passage portions 26' and 28'. These feedback passage portions communicate with openings 26",28" defined in laminae "g" and "f", as well as with restrictive orifices 42 and 44, the latter of which are defined only in lamina "f". Viewing laminae "e" and "d", it will be seen that the feedback channels are completed by a pair of aligning elongate openings 26''' and 28''' communicating the openings 26" and 28" of lamina "f" with the restrictive orifices 42 and 44 thereof. Lamina "c" defines a pair of restrictive orifices 38 and 40 respectively communicating with the elongate openings 26''' and 28''' of laminae "d" and "e". The restrictive orifices 38 and 40 of lamina "c" align with holes 30 and 32 defined by lamina "b" to define the branch passages opening to the sensing chambers 34 and 36, recalling the description of FIGS. 1 and 2.

Viewing FIG. 4 once again, it will be seen that lamina "a" defines a pair of large openings 34',36' communicating with the holes 30 and 32 of lamina "b", and the function of which will be further described hereinafter. Lamina "a" also defines a pair of elongate notches 34",36" extending radially outwardly from openings 34',36', respectively. Lamina "b" defines a pair of holes 46',48' communicating also with the openings 34',36' of lamina "a" and further communicating with restrictive openings 50 and 52 of lamina "c". The vent passages are substantially defined by lamina "d" which provides a pair of elongate slots 46 and 48 communicating with the restrictive openings 50 and 52 and extending to the edge of the laminae. In order to complete the description of the laminae stack shown in FIG. 4, it must be noted that lamina "i" defines four rather winged-shaped openings 76' in alignment with the interaction chamber 76 defined by lamina "h". The openings 76 of lamina "i" align with a collection chamber 24' portion of outlet 24 defined by lamina "j" and communicating with an outlet slot 24 extending to the edge thereof. It will be understood that while lamina "a" is the top lamina of a fluidic laminae stack embodying the features of the present invention, the stack would ordinarily be bounded at its opposite side by a plain lamina having no fluidic openings therein and bounding the outlet chamber 24' and outlet 24 below lamina "j" and the plane of FIG. 4.

Figure 5:
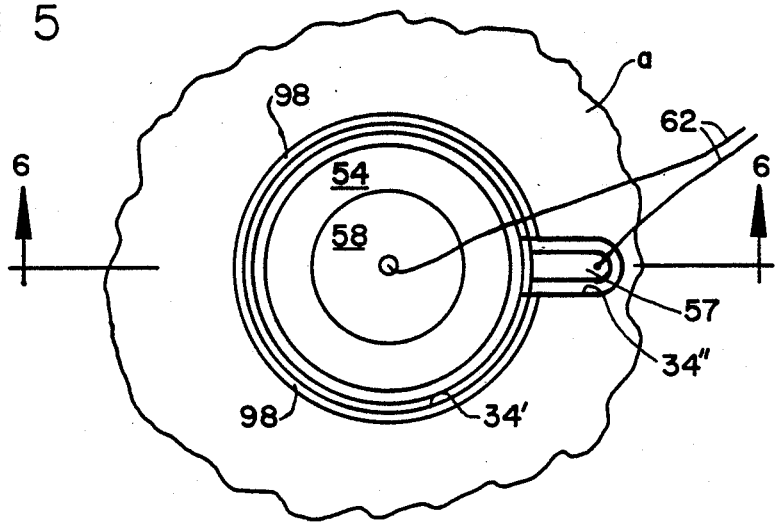
Figure 6:
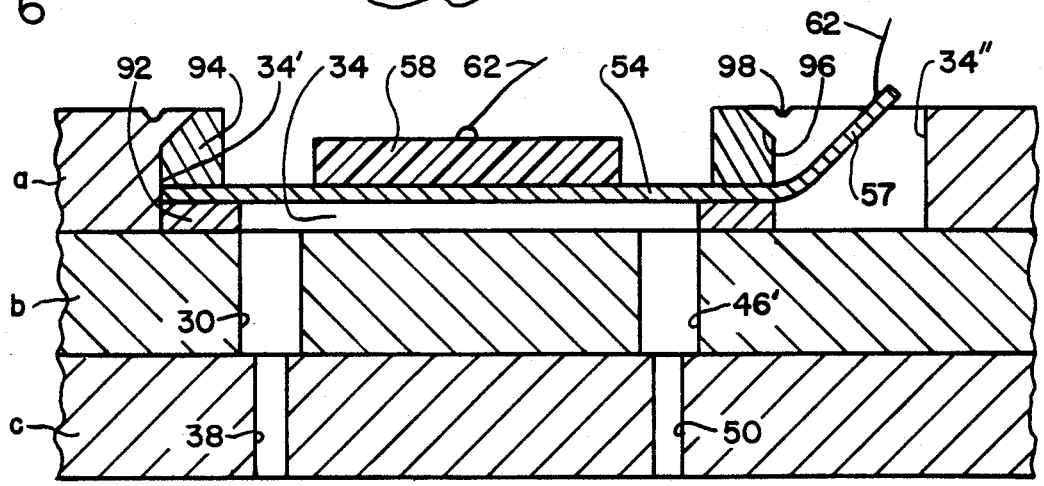

FIGS. 5 and 6 in conjunction depict a fragment of the structure of the laminae stack shown in FIG. 4. Viewing FIG. 5 in particular it will be seen that the laminae "a", "b" and "c" in conjunction substantially define the sensing chamber 34, the branch and vent passages 30 and 46' respectively, and the flow restrictive orifices 38 and 50. The structure defining sensing chamber 36 is substantially similar, and so will not be further described. Recalling the description of FIG. 4, it will be seen that the restrictive opening 38 communicates with the opening 26''' in lamina "d" while the flow restrictive orifice 50 communicates with vent passage slot 46 in lamina "d". Received within the opening 34' of lamina "a" is an annular spacing and sealing member 92. The member 92 sealingly engages the surface of lamina "b". The flexible diaphragm 54 is received into opening 34' of lamina "a" and sealingly engages the sealing and spacing member 92. Because of the sealing and spacing member 92, the diaphragm 54 is spaced slightly away from the lamina "b" to cooperatively define the sensing chamber 34. An annular capture member 94 is also received in opening 34' in engagement with the outer surface of diaphragm 54. The capture member 94 defines a chamber 96 on the outer diameter thereof.

Viewing FIGS. 5 and 6 in conjunction, it will be seen that the material of lamina "a" is swaged radially inwardly at 98 toward the center of opening 34' and against the shoulder 96 presented by ring 94 to capture the ring, the diaphragm 54 and the spacing member 92 within the opening 34'. FIG. 6 depicts that the swaging of lamina "a" is performed as a substantially circumferentially continuous groove 98. Because of the swaging 98 of the material of lamina "a" into engagement with shoulder 96 of the capture ring 94, the ring 94 is held into tight engagement with the diaphragm 54, and the latter is likewise held in sealing engagement with the sealing ring 92. The groove resulting from swaging lamina "a" at 98 is interrupted by notch 34", which extends radially outwardly from opening 34' of lamina "a". Diaphragm 54 defines a radially outwardly extending portion 57 extending into the notch 34" outwardly of ring 94. The portion 57 is bent upwardly out of the plane of diaphragm 54 to displace the outer end thereof toward the outer surface of lamina "a". One wire 62 is connected to the portion 57 adjacent the outer end thereof.

Mounted upon the diaphragm 54 by use of an electrically conductive adhesive is a piezoceramic disc 58 which has previously been identified in the schematic representations of the invention as a transducer member. The piezoceramic disc conventionally responds to flexure of the diaphragm 54 by producing an electrical output conducted to a point of utilization via the other conductor 62. In order to electrically isolate the diaphragm 54, and piezoceramic disc 58 mounted thereon, from the housing cooperatively defined by laminae "a"–"j", the radially outer peripheral portion of the diaphragm is provided with a relatively thin coating of dielectric polymer. This polymer coating may be tetrafluoroethylene, for example. While this insulative coating on diaphragm 54 is too thin to be effectively depicted in FIGS. 5 and 6, it is depicted schematically as insulation 55 on FIG. 2. The insulative coating 55 on diaphragm 54 is of sufficient thickness to effectively isolate the latter from electrical contact with lamina "a" or "b" via the spacing ring 92, as well as from lamina "a" via capture ring 94, viewing FIG. 6.

Figure 7:
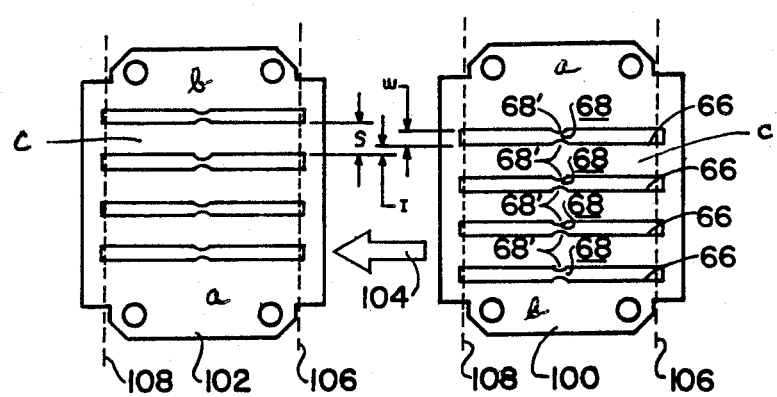
FIG. 7 depicts two laminae at an intermediate stage of manufacture which when stacked and interbonded with other like lamina substantially defines a fluid bypass component of a fluid flow meter according to the invention.

Turning once again to FIG. 1, it will be recalled that the bypass unit 14 defines a plurality of bypass passages 66, each provided with its own restriction 68 replicating the coefficient of discharge characteristic of the power jet within the fluidic oscillator 20. FIG. 7 depicts a pair of laminae 100,102 at an intermediate stage of manufacture for the bypass unit 14. It will be noted that each of the laminae 100,102 similarly to the laminae "a" through "j" depicted in FIG. 4 conventionally includes four unreferenced alignment holes which are used during the manufacture of a laminae stack, as will be readily understood by those skilled in the fluidic art. Viewing the laminae 100 and 102, it will be immediately noted that these laminae are substantially identical with one being simply flipped over or reversed top to bottom with respect to the other. Each laminae includes larger end portion a, and a smaller end portion b. Spaced between the end portions a and b are plural substantially identical boundary portions c. These end portions and boundary portions a, b, c, cooperatively define a; plurality of elongate openings 66 extending from near one edge to near the other edge. The plurality of openings 66 are, as a group, offset toward the one end b of the lamina 100, 102 and away from the other end a. This offset results in the end portions a and b being of different sizes. The offset of the group of openings 66 in each lamina results in the boundary portions c aligning with the openings 66 when successive ones 100, 102 of the substantially identical laminae as alternated end for end and stacked, as is seen viewing FIG. 7. Intermediate of the ends of the opening 66 each lamina defines a pair of confronting protrusions 68' which cooperate to define the fluid flow restrictions 68. Each of the elongate openings 66 defines a width dimension which is referenced on lamina 100 with the character W. Also, the elongate openings 66 are spaced apart by a dimension referenced on lamina 102 with the character S. That is, the boundary portions have a width dimension S perpendicular to the length of the openings 66. The dimension S exceeds the width W of the elongate openings 66 according to twice an interbonding dimension referenced between the laminae 100 and 102 with the reference character I.

It will be seen that when the laminae 100 and 102 are stacked one upon the other as depicted by arrow 104, an interbonding region is provided on each side of each elongate opening 66, which in width is equal to dimension I. Therefore, a plurality of laminae 100,102, each being substantially identical, may be stacked, with each one being reversed or flipped end for end respective to its immediately adjacent neighbors, and interbonded. The interbonded stack of laminae 100,102 is then trimmed at each side along a cutting line 106,108 to open the ends of the elongate openings 66. Thus, the openings 66 define bypass passages extending through the bypass unit 14 from one face to the other. The end portions a and b of successive laminae in the stack bond to one another. Each end portion a bonds to the boundary portions c next in the stack of laminae, while adjacent boundary portions c bond to their neighbors in the laminae stack. Therefore, cutting off the parts of each laminae 100, 102 outside of the trimming lines 106, 108 simply opens the passages 66, but does not affect the structural integrity of the laminae stack after interbonding. Each bypass passage 66 is rectangular in cross section and is bounded on opposite sides by portions of a single lamina. These portions are either an end portion a or b, and adjacent boundary portion c; or a pair of boundary portions c. On the other two opposite sides, each passage 66 is bounded either by boundary portions c or end portions b of lamina adjacent in the stack of laminae. Those skilled in the fluidic art will recognize that a laminae stack for making a bypass unit 14 will also include at each end thereof for bounding the outermost bypass passages 66 a plain lamina having no openings other than the unreferenced alignment holes.

Viewing FIG. 8, it will be seen that the resulting bypass unit 14 is essentially a prismatic solid having openings 66 extending therethrough from one face of the prism to the opposite face. Because of the way in which the laminae 100,102 were reversed or alternated in the stacking of bypass unit 14, the plurality of bypass passages 66 are arranged within the bypass unit in a regular grid-like pattern. Also, viewing FIG. 8 it will be noted that the previously unreferenced alignment holes which were conventionally used during manufacturing for stacking of the laminae preparatory to the interbonding process may advantageously be used for intersecuring a bypass unit 14 to a fluid flow rate sensing module 20. Each of the alignment holes which are referenced on FIG. 8 with the numeral 110 may, when a bypass unit 14 is stacked with an oscillator module 20, align with one another and removably receive a rolled spring steel pin 112. That is, the fluid flow rate sensing module 20 and the bypass unit 14 are congruent when placed side by side. The spring steel pin 112 is removably force-fitted into the aligned holes 110 of the bypass module 14 and oscillator module 20 to hold these two modules securely together while allowing optional disassembly thereof.

FIG. 9 depicts a portion of a redundant fluid flow meter according to the invention. The redundant fluid flow meter of FIG. 9 includes a first meter 10 having a bypass unit 14 and fluidic oscillator device 20, and a second fluid flow meter 10' having an associated bypass unit 14' and fluidic oscillator device 20'. The first and second fluid flow meters 10 and 10' are substantially identical and are arranged with their inlets and outlets like disposed. Interposed between the two fluid flow meters 10 and 10' is a spacing member 114 defining four through holes 116 which have the same spacing therebetween as the alignment holes 110 in the bypass units 14,14' and fluidic oscillator devices 20,20'. The spacing member 114 also defines a C-shaped through passage 118 opening outwardly in a downstream direction. The through passage 118 when the fluid flow meters 10 and 10' are assembled with the spacing member 114 provides liquid communication to the outer face of the flexible diaphragms 54 and 56 of each of the fluid flow meters 10 and 10'. The through passage 118 within spacing member 114 also provides a chamber 120 within which the conductor 62,64 from the piezoceramic discs and diaphragms on each of the oscillator devices 20 and 20' are received. The conductors 62 and 64 may advantageously be led outwardly from the piezoceramic discs 58,60 and chamber 120 through an opening 122 extending from the latter to open outwardly on the spacing member 114. Viewing FIG. 9 and considering the arrangement of the modules 10 and 10' when sandwiching the spacing member 114 therebetween, it will be seen that the alignment holes 110 of each of the fluid flow meters aligns with one another and with the through holes 116 of the spacing member 114. Consequently, relatively long spring steel roll pins 124 may be forcibly inserted into the aligned holes 110 of the fluid flow meters 10 and 10' and into the through holes 116 of spacing member 114 to secure these elements together.

FIGS. 10 and 11 illustrate that a fluidic flow meter like that illustrated in FIG. 9 may be advantageously housed within a housing 126 providing a rectangular recess 128 therein for receiving the fluidic flow meters 10 and 10' along with the spacing member 114. The housing 126 provides an inflow passage 130 extending to the recess 128 and flow meter 10,10' therein. Within the recess 128, the flow meter 10,10' is sealingly received upon a resilient gasket 132 disposed upon a shoulder 134 defined by the cooperation of recess 128 and inflow passage 130. In order to urge the flow meter 10,10' into sealing engagement with the gasket 132, a spacing member 136 and outlet coverplate 138 are provided. The spacing member 136 is rectangular in plan view to slidably be received within the recess 128 above the flow sensor 10. Spacing member 136 defines a through passage 140 leading from the outlets of the flow sensor 10,10' and of the bypass units 14 thereof. The outlet coverplate 138 is removably secured to the housing 126, as by fasteners 142 passing therethrough and threadably engaging the housing 126. The outlet coverplate 138 defines an outlet port 144 opening from a chamber 146 defined by the cooperation of the spacer member 136, the through passage 140 thereof, the fluid flow sensor 10,10' and the outlet coverplate 138. The housing 126 also defines a passage 148 aligning with the passage 122 (viewing FIG. 9) of the spacer member 114 of fluid flow sensor 10,10' and providing for passage of the conductors 62,64 outwardly of the housing 126.

Recalling the description of FIGS. 2, 5 and 6, particularly with reference to the electrically insulative coating 55 upon the diaphragms 54,56 and the purpose thereof, it will be noted that as installed in the cavity 128, the fluid flow meters 10,10', are electrically in contact with the housing 126. On the other hand, the diaphragms 54,56, and piezoceramic discs 58,60 thereon are electrically isolated from and surrounded by the housing 126 and the remainder of the fluid flow meter. Additionally, viewing FIG. 9 it will be seen that the remainder of the fluid flow meters 10,10' along with the spacer member 114 virtually completely surround the diaphragms 54,56 and piezoceramic discs 58,60. Consequently, the Applicants believe the remainder of the fluid flow meters 10,10' may electrically shield the electrical output portions of the invention from electrical interference.

FIGS. 12 and 13 depict an alternative embodiment of the invention wherein the fluidic oscillator module 20 is received between a bypass plate 150 and a bar-like retaining member 152. The bypass plate 150 provides a central inlet passage 154 leading to the inlet of the fluidic oscillator module 20. Also, the bypass plate provides a plurality of bypass passages extending therethrough, and each replicating the coefficient of discharge of the power jet nozzle within the fluidic oscillator module 20. The bypass plate 150, oscillator module 20, and retainer 152 are received within a three-part housing generally referenced with the numeral 158. The housing 158 includes a central portion 160 defining a through bore 162. Each of the bypass plate 150 and retainer member 152 define a reduced diameter portion cooperating with the remainder of each to define respective shoulders 164,166. The reduced diameter portion of each of the bypass member 150 and retainer member 152 are received into the through bore 162 of the central portion 160 so that the shoulder 164 sealingly engages the central portion 160. A pair of fasteners 168 extend between the bypass plate 150 and retainer 152 to urge the latter into engagement with the central portion 160 of housing 158.

The spacing between the bypass plate 150 and retainer member 152 is selected to captively receive the fluidic oscillator module 20 therebetween. A sealing member 170 is provided between the bypass plate 150 and the fluidic oscillator module 20. The central portion 160 of housing 158 defines a radially extending boss 172 which defines a mounting surface 174 upon which is sealingly secured an electrical connector 176. The connector 176 provides for conduction outwardly of the housing 158 of the electrical signals originating with the piezoceramic transducers of the fluidic oscillator module 20.

The housing 158 also includes a pair of end portions 178 and 180 which are substantially identical. The end portions 178 and 180 each define a threaded part 182 which is configured to sealingly mate with a standard tube fitting (not shown). The end portions 178, 180 provide an inlet for fluid flow to the fluidic oscillator member 20 and bypass plate 150, and flow therefrom, as is indicated by the arrow 184. Each of the end portions 178 and 180 are sealingly secured to the center portion 160 of the housing 158 as by a plurality of fasteners 186 passing therethrough via aligned holes in each. The embodiment of the invention depicted by FIGS. 12 and 13 has been found by the Applicants to be particularly useful for in-line applications in which it is desirable to determine the volumetric fluid flow rate through a pipeline or conduit, for example.

While the present invention has been depicted and described with reference to several preferred embodiments thereof, no limitation upon the invention is implied by such reference, and no such limitation is to be inferred. The invention is intended to be limited only by the spirit and scope of the appended claims, which also provide an additional definition of the invention.

We claim:

1. Fluidic apparatus comprising:
a housing defining;
an inlet for receiving a flow of fluid, an outlet, and a flow path extending from said inlet to said outlet; a part of said flow path defining a power nozzle upstream of and leading to an interaction chamber, said interaction chamber opening to said outlet, a splitter opposite said power nozzle across said interaction chamber, said splitter being in spaced alignment with said power nozzle and projecting theretoward to separate a pair of feedback inlets leading from said interaction chamber, a pair of feedback channels respectively extending from said pair of feedback inlets to a respective pair of feedback outlets intermediate said interaction chamber and said power nozzle, said pair of feedback outlets being oppositely disposed across said power nozzle and each on the same side thereof as the one of said pair of feedback inlets connecting therewith, a pair of branch passages respectively extending from said pair of feedback channels to a pair of variable-volume sensing chambers, a pair of flexible diaphragm members respectively bounding said pair of variable-volume sensing chambers, each one of said pair of diaphragm members being movable in response to fluid pressure fluctuations to result in volume variation of said respective one of said pair of sensing chambers, fluid flow restriction means in each of said pair of branch passages for resisting dynamic oscillation (ringing) of fluid flowing in said feedback channels with the variable-volume of fluid in said sensing chambers; and
means for producing an output signal in response to movement of said pair of diaphragm members.

2. The invention of claim 1 wherein said housing further defines second restriction means respectively in each of said pair of feedback channels intermediate the connection thereto of said pair of branch passages and said pair of feedback outlets for increasing the magnitude of pressure fluctuations in said pair of sensing chambers.

3. The invention of claim 1 wherein said housing further defines a pair of vent passages respectively opening outwardly from said pair of sensing chambers to communicate with said outlet.

4. The invention of claim 3 wherein said housing further defines another restriction means in each of said pair of vent passages for controlling venting fluid flow therethrough.

5. The invention of claim 1 wherein said apparatus further comprises a bypass member in fluid flow parallel with said housing; said bypass member defining an inlet side in flow communication with said housing inlet and an outlet side in flow communication with said housing outlet, and a plurality of fluid flow bypass channels opening from said inlet side to said outlet side communicating fluid flow therebetween, said power nozzle having a fluid flow characteristic of discharge coefficient, said bypass member also defining flow restriction means in each of said plurality of flow bypass channels for each replicating said power nozzle fluid flow characteristic.

6. The invention of claim 5 wherein said apparatus further includes fluid flow conduit means for defining an inlet port leading to said housing inlet and an outlet port communicating with said housing outlet, said bypass member comprising a plate member separating said conduit means into an inlet flow portion and an outlet flow portion, said flow meter housing securing to said plate member downstream thereof, and said plate member defining a through passage communicating said inlet port with said housing inlet, said plate member and said housing defining cooperating sealing means circumscribing said through passage for preventing leakage of fluid therebetween, said plate member defining said plurality of bypass channels and said flow restriction means therein.

7. The invention of claim 6 wherein said conduit means includes: an inlet portion defining said inlet port and bounding said inlet flow portion; a center portion defining a through bore in part bounding and defining said outlet flow portion, said center portion further including means for sealingly conducting said output signal externally of said flow meter apparatus; an outlet portion downstream of said center portion and defining said outlet port; each of said center portion, said inlet portion, and said outlet portion defining cooperating sealing means for preventing fluid flow therebetween; said bypass plate member being disposed within said inlet portion and engaging an upstream end of said center portion to sealingly span said through bore; a retainer member disposed within said outlet portion and engaging a downstream end of said center portion to span said through bore, means for biasing said bypass plate member and said retainer member toward one another; and said housing being sandwiched captively between said bypass plate member and said retainer member within said center portion of said conduit means.

8. The invention of claim 5 wherein said bypass member comprises a plurality of stacked and interbonded bypass laminae, each of said plurality of stacked laminae including:
(a) a pair of spaced apart end members;
(b) a plurality of elongate boundary members substantially equally spaced apart between said pair of end members, the pair of said boundary members adjacent to said pair of end members also defining a spacing therewith which is substantially equal with the spacing between adjacent boundary members; said pair of end members and said plurality of boundary members cooperating to define therebetween said plurality of fluid flow channels;
said flow restriction means comprising each of said pair of end members and each of said plurality of boundary members defining a like protrusion extending toward the next adjacent one of said pair of end members or plurality of boundary members, said protrusions of next adjacent members being in alignment with one another to replicate said power nozzle flow characteristic for each of said plurality of bypass channels.

9. The invention of claim 8 wherein said pair of end members are dissimilar, a first of said pair of end members defining a determined width dimension, the second of said pair of end members defining a certain width dimension which differs from said determined width dimension according to said spacing between adjacent boundary members plus an interbonding dimension;
each one of said plurality of stacked laminae being substantially identical, with successive lamina in said stack being reversed end-for-end so that the first end of any one lamina is adjacent the second end of the next adjacent lamina.

10. The invention of claim 9 wherein each of said plurality of elongate boundary members each define a like boundary member width dimension, said boundary member width dimension exceeding said spacing between adjacent boundary members according to twice said interbonding dimension.

11. The invention of claim 5 wherein said housing defines a prismatic body having a rectangular upstream inlet end defining said inlet and an opposite rectangular downstream outlet end defining said outlet, said bypass member defining a similar prismatic body having a side congruent with said housing, said bypass member having an upstream end defining said inlet side and an opposite downstream end defining said outlet side.

12. The invention of claim 11 wherein said housing and said bypass member define cooperating means for congruent side-by-side intersecurement.

13. The invention of claim 12 wherein said intersecurement means includes each of said housing and said bypass member defining a respective duality of aligning bores, a duality of generally circular cylindrical intersecurement members each received in the respective aligning bores of both said housing and said bypass member.

14. The invention of claim 12 wherein said means for producing an output signal are disposed on a side surface of said housing congruent with said bypass member but opposite therefrom.

15. The invention of claim 14 wherein said apparatus further includes a first housing member and respective first bypass member together defining a first flow sensor module;
a second flow sensor module substantially identical with said first flow sensor module;
said first and said second flow sensor module being like disposed with respective inlets and outlets receiving and discharging said fluid flow, respectively, and being reversed end-for-end so that said side surfaces carrying said output signal producing means are confronting one another and said bypass members are spaced apart, said flow sensor modules thus cooperating to define a plane of substantial symmetry therebetween; and
a spacing member externally of prismatic shape having a side congruent with each said first and said second sensor module side which carries said output signal producing means, said spacing member being disposed on said plane of substantial symmetry, and said spacing member being stacked with said first and said second flow sensing module in congruence therewith, said spacing member defining a chamber and a passage opening outwardly therefrom; and
means for conducting said output signal of each said first and said second flow sensor module extending outwardly through said chamber and said passage of said spacing member, whereby said output signal producing means is substantially shielded electrically by the remainder of said apparatus.

16. The invention of claim 15 wherein said spacing member and each of said first and said second flow sensing module define cooperating means for congruent intersecurement.

17. The invention of claim 1 wherein said means for producing an output signal comprises said housing defining a recess opening outwardly thereon and having an end wall, an open-centered spacing and sealing member received in said recess, one of said pair of diaphragm members being received in said recess in sealing engagement with said spacing and sealing member to be spaced away from the end wall of said recess, a capture member received in said recess upon said diaphragm member and being similarly open centered to allow flexure of the latter, said housing being swaged inwardly into retaining engagement with said capture member to retain the latter, said diaphragm, and said spacing and sealing member in said recess.

18. The invention of claim 17 further including a piezoceramic disc securing to said diaphragm for flexure therewith, said diaphragm being of electrically conductive material and being in electrical contact with said piezoceramic disc, and electrical circuit means including said diaphragm and said piezoceramic disc.

19. The invention of claim 18 wherein said housing defines an elongate notch extending radially outwardly of said recess and outwardly of said capture member and said sealing and spacing member, said one diaphragm member defining an elongate protruding portion extending into said notch outwardly of said capture member, said electrical circuit means including a conductor connecting with said protruding portion.

20. Fluidic method of producing a cyclic output signal whose frequency is proportional to volume flow rate of a fluid and which is substantially free of non-signal noise, said method comprising the steps of:
forming said fluid flow into a jet;
discharging said jet across an interaction chamber toward a distant splitter member separating a pair of feedback inlets;
forming a pair of like elongate feedback channels extending respectively from said pair of feedback inlets individually to a pair of oppositely disposed feedback outlets which are directed transverse to said jet proximate to the discharge of the latter;
first, collecting a relatively larger fraction of said jet in a first of said pair of feedback inlets to create a fluid flow pulse in the respective, first of said pair of feedback channels;
second, discharging a portion of said fluid flow pulse from the respective first of said pair of feedback outlets to deflect said jet away from said first feedback inlet toward the second of said pair of feedback inlets to create a sequential fluid flow pulse in the second of said pair of feedback channels;
third, discharging a portion of said sequential fluid flow pulse from the second of said pair of feedback outlets to again deflect said jet toward said first feedback inlet;
cyclically repeating the first, second and third steps immediately above to create a succession of fluid flow pulses in said pair of feedback channels, the frequency of which is proportional to volumetric flow rate of said fluid,
communicating said succession of fluid flow pulses from at least one of said pair of feedback channels to transducing means responsive to fluid pressure fluctuations to produce said output signal in response thereto; and
inhibiting undesirable dynamic interaction (ringing) between said one feedback channel, the fluid flow pulses therein, and said transducing means to preclude generation of non-signal noise in said output signal.

21. The method of claim 20 wherein said inhibiting step includes providing fluid flow restriction means interposed in said fluid communication between said one feedback channel and said transducing means.

22. The method of claim 21 further including the step of increasing the magnitude of said fluid flow pulses and pressure fluctuations thereof manifest to said transducing means by interposing second fluid flow restriction means between the communication to said transducing means with said one feedback channel and the respective one of said pair of feedback outlets.

23. The method of claim 21 further including the steps of providing a venting flow path opening outwardly of said feedback channel intermediate of said fluid flow restriction means and said transducing means, and providing third fluid flow restriction means in said flow path.

24. The method of claim 20 further including the steps of providing housing means in part defining a variable-volume chamber of said transducing means, utilizing a flexible diaphragm member to bound said variable-volume chamber, flexing said diaphragm member in response to said pressure fluctuations communicating to said chamber, producing said output signal electrically in response to flexure of said diaphragm member, and electrically isolating said diaphragm member from said housing means to prevent electrical interference being manifest in said output signal.

25. The method of claim 24 wherein said electrical isolation of said diaphragm member is achieved by providing a film coating of dielectric polymer on an outer peripheral portion of said diaphragm, and sealingly interengaging said diaphragm member at said outer peripheral portion thereof with said housing means to bound said variable-volume chamber.

26. Fluidic apparatus comprising a housing defining a flow path communicating fluid pressure pulses, an opening from said flow path communicating said pressure pulses to a variable-volume chamber, a flexible diaphragm bounding said variable-volume chamber to flex in response to pressure pulses communicating thereto, means electrically producing an output signal in response to said flexure of said diaphragm, and means electrically isolating said output producing means from said housing, wherein said diaphragm comprises electrically conductive material, said output producing means including a piezoceramic disc securing in electrical contact to said diaphragm for flexure therewith, and said isolation means including electrical insulation means interposing between said diaphragm and said housing.

27. The invention of claim 26 wherein said insulation means comprises a dielectric film coating on at least a portion of said diaphragm.

28. The invention of claim 27 wherein said housing defines a recess opening thereon and having an end wall, said diaphragm being sealingly received in said recess, an open-centered sealing member interposed in spacing relationship between said diaphragm and the end wall of said recess, an open-centered capture member received in said recess in retaining relation with said diaphragm, said housing being swaged into retaining engagement with said capture member at the opening of said recess.

29. The invention of claim 29 wherein said housing defines a notch extending radially outwardly from said recess, said diaphragm including an elongate radially outwardly extending portion protruding into said recess outwardly of said capture ring and sealing member, said output signal producing means including an electrical conductor securing to said diaphragm protruding portion proximate a distal end thereof.

30. Apparatus for measuring liquid volume flow rate comprising: fluidic oscillator means having power nozzle means for receiving a flow of liquid and forming said flow into a liquid jet, means for using said liquid jet to create in a channel having a fluidic inductance, a pulsating pressure signal whose frequency is indicative of liquid volume flow rate through said power nozzle, means communicating with said channel and said pulsating pressure signal therein and having a fluidic capacitance for producing an output signal in response to said pulsating pressure signal, and means for inhibiting undesirable dynamic interaction (ringing) of said fluidic inductance of said channel with said fluidic capacitance of said output signal producing means.

31. The invention of claim 30 wherein said inhibiting means includes a fluid flow restriction interposed between said channel and said output signal producing means.

32. The invention of claim 31 further including another fluid flow restriction interposed in said channel downstream with respect to propagation of said pulsating pressure signal of the communication therewith of said output signal producing means.

33. Apparatus for measuring liquid volume flow rate comprising: fluidic oscillator means having power nozzle means for receiving a flow of liquid and forming said flow into a liquid jet, means for using said liquid jet to create in a channel having a fluidic inductance, a pulsating pressure signal whose frequency is indicative of liquid volume flow rate through said power nozzle, means communicating with said channel and said pulsating pressure signal therein and having a fluidic capacitance for producing an output signal in response to said pulsating pressure signal, and means for inhibiting undesirable dynamic interaction (ringing) of said fluidic inductance of said channel with said fluidic capacitance of said output signal producing means, wherein said inhibiting means includes a fluid flow restriction interposed between said channel and said output signal producing means, further including vent passage means opening outwardly from said output signal producing means for purging compressible fluid therefrom, and a third fluid flow restriction interposed in said vent passage means.

34. The invention of claim 33 wherein said output signal producing means comprises said apparatus defining a variable-volume chamber communicating with said channel, a flexible electrically conductive diaphragm member bounding said variable-volume chamber to flex in response to said pulsating pressure signal, a piezoceramic disc securing in electrical contact with said diaphragm member for flexure therewith, and electrical circuit means including said diaphragm member and said piezoceramic disc for conducting said output signal.

35. The invention of claim 34 further including electrical insulation means for isolating said diaphragm member and said piezoceramic disc from the remainder of said apparatus.

36. The invention of claim 35 wherein said electrical insulation means comprises a dielectric film coating on an outer peripheral edge portion of said diaphragm member.

37. The invention of claim 35 further including said apparatus defining means for additionally shielding said diaphragm member and said piezoceramic disc from ambient electrical interference.

38. The invention of claim 33 additionally including bypass means in fluid flow parallel with said fluidic oscillator means, said bypass means defining a plurality of bypass passages, and flow restriction means in association with each bypass passage for replicating a discharge coefficient of said power nozzle.

39. The invention of claim 38 wherein said fluidic oscillator means comprises a housing exteriorly defining a prismatic body, said bypass means also comprising another housing similarly exteriorly defining another prismatic body, said housing and said another housing being congruent, and means for removably coupling said housings in side-by-side congruence as a module.

40. The invention of claim 39 wherein said output signal producing means is disposed on a side of said housing opposite said bypass means.

41. The invention of claim 40 further including a second fluidic oscillator and a second bypass means each having respective housings substantially similar to the first-recited fluidic oscillator and bypass means and being removably coupled to provide a complete second module, said housings defining like-disposed fluid inlets and outlets on opposite edge surfaces thereof, and said modules confronting one another across a plane of symmetry to dispose respective output signal producing means theretoward, a spacing member interposed between said module and said second module on said plane of symmetry, said spacing member defining a chamber between said modules for communicating with said outlets.

42. The invention of claim 39 further including base means defining a prismatic recess sealingly receiving said module and defining flow path means for communicating fluid therethrough.

43. The invention of claim 38 wherein said bypass means carries said fluidic oscillator.

44. Fluidic apparatus comprising:
(a) an exteriorly prismatic body having a first flow path defining a fluidic oscillator therewithin, said oscillator having a power jet nozzle of selected discharge coefficient, and the frequency of oscillation of which is indicative of fluid volumetric flow through said oscillator;
(b) means for producing an output signal in response to oscillation of said fluidic oscillator;
(c) bypass means for providing plural bypass passages in fluid flow parallel with said oscillator each replicating said selected discharge coefficient; and
(d) a housing providing an inlet port, an outlet port, and a second flow path extending therebetween, said prismatic body and said bypass means being disposed in said second flow path, said housing providing an inflow and outflow chamber portion of said second flow path each communicating with both said oscillator flow path and with said bypass passages.

45. The invention of claim 44 wherein said bypass means comprises a plate member defining said bypass passages and carrying said prismatic body.

46. The invention of claim 44 wherein said bypass means comprises a second exteriorly prismatic body congruent in side-by-side relation with said prismatic body defining said oscillator, and means for securing said prismatic body and said second prismatic body in side-by-side relationship to define a combined prismatic body.

47. The invention of claim 46 wherein said housing includes a prismatic recess in part defining said second flow path, said prismatic recess slidably receiving said combined prismatic body in closely shape-matching relationship, and sealing means for preventing fluid leakage between said housing and said combined prismatic body.

48. The invention of claim 47 wherein said housing defines a bore opening to said prismatic recess and cooperating with the latter to define a step, said bore defining a portion of said second flow path, and said combined prismatic body being disposed upon said step, said sealing means comprising a resilient gasket interposed upon said step in sealing engagement with said housing and said combined prismatic body.

* * * * *